(12) United States Patent
Lakaniemi et al.

(10) Patent No.: US 7,111,091 B2
(45) Date of Patent: Sep. 19, 2006

(54) DEVICE AND METHOD FOR CONTROLLING A STREAM OF DATA PACKETS

(75) Inventors: Ari Lakaniemi, Helsinki (FI); Vilho Räisänen, Helsinki (FI)

(73) Assignee: Nokia Corporation, Espoo (FI)

( * ) Notice: Subject to any disclaimer, the term of this patent is extended or adjusted under 35 U.S.C. 154(b) by 273 days.

(21) Appl. No.: 10/451,220

(22) PCT Filed: Dec. 21, 2000

(86) PCT No.: PCT/EP00/13118

§ 371 (c)(1),
(2), (4) Date: Nov. 21, 2003

(87) PCT Pub. No.: WO02/50655

PCT Pub. Date: Jun. 27, 2002

(65) Prior Publication Data

US 2004/0093440 A1    May 13, 2004

(51) Int. Cl.
*G06F 3/00* (2006.01)
*G06F 15/16* (2006.01)

(52) U.S. Cl. .................. 710/52; 709/233; 709/234; 710/60

(58) Field of Classification Search ............ 710/29, 710/33–35, 52–53, 57–60; 370/232
See application file for complete search history.

(56) References Cited

U.S. PATENT DOCUMENTS

| | | | |
|---|---|---|---|
| 4,270,183 A | | 5/1981 | Robinson et al. |
| 5,054,078 A | * | 10/1991 | Schorman et al. ......... 381/110 |
| 5,500,689 A | * | 3/1996 | Lam ........................ 348/699 |
| 5,592,658 A | * | 1/1997 | Noam ....................... 713/503 |
| 6,778,499 B1 | * | 8/2004 | Senarath et al. ........... 370/232 |

FOREIGN PATENT DOCUMENTS

EP    0 031 031 A2    7/1981

OTHER PUBLICATIONS

Patent Abstracts of Japan, vol. 017, No. 066, Feb. 9, 1993 & JP 04 274572.

* cited by examiner

*Primary Examiner*—Fritz Fleming
*Assistant Examiner*—Richard B. Franklin, Jr.
(74) *Attorney, Agent, or Firm*—Squire, Sanders and Dempsey, LLP.

(57) ABSTRACT

The present invention proposes a device for controlling a stream of data packets, comprising: a buffer (2) adapted to receive a data packet stream from a data source (1) and to output said packet data stream with an output rate to a packet data communication network (7), a monitoring means (4) adapted to monitor a fill level of said buffer (2), a detection means (5) adapted to detect a fill level condition of said buffer (2), in which an incoming data packet has to be dropped, and adapted to control a dropping means (6) for dropping an incoming data packet upon detection of said fill level condition, and further comprising an output rate control means (5a, 8, 9, 10, 11) adapted to control an output rate adjusting means (3) which is adapted to adjust said output rate of said buffer (2), wherein said output rate control means, in response to said fill level condition detected by said detection means (5), issues a first control signal (5a) controlling said adjusting means (3) to increase a current output rate of said buffer to a predefined output rate, and said output rate control means, in response to each non-dropped data packet received after said detection by said detection means (2), issues a second control signal (11a) controlling said adjusting means (3) to decrease a currently adjusted output rate. The present invention also proposes a corresponding control method.

26 Claims, 3 Drawing Sheets

DEVICE AND METHOD FOR CONTROLLING A STREAM OF DATA PACKETS

FIELD OF THE INVENTION

The present invention relates to a device for controlling a stream of data packets as well as to a corresponding method.

BACKGROUND OF THE INVENTION

Techniques for transmission of real-time signals such as streaming audio or video, voice over IP (VoIP) or videoconferencing media streams in Internet Protocol (IP) based networks are in high demand due to prospect of cost savings derived from the use of datacommunications equipment based on packet switched transmission instead of circuit-switched transmission networks.

To accomplish this task, certain Quality of Service (QoS) problems need to be solved. One such problem is the variability of transmission delays in IP networks. Such a variability leads to variation of packet interarrival times, even if the packets had been transmitted at equal intervals. Such a variation in interarrival times leads to burstiness of data stream bandwidth. Stated in other words, although data packets are transmitted by a data source (e.g. a communication terminal or network element) in regular/constant intervals, these intervals might be subject to variation due to the transmission path for/processing of the data packets within the network. As a result, the data packets are received at the destination (e.g. a communication terminal or network element) in clusters or groups in which an interval between packets is shorter than the interval between the sent packets, and/or wherein an interval between consecutively received data packets is longer than the interval between the sent packets. This phenomenon is also referred to as burstiness.

This kind of variability can be reduced with traffic shaping. Traffic shaping is accomplished by using a traffic shaper device with a configurable output bandwidth. Note that throughout the specification, a bandwidth (input or output bandwidth) of a device related to data packet transmission is intended to mean a corresponding data rate of the sent/received data packets (i.e. number of data and/or data packets per unit time).

If such a high number of packets arrives at the input of a traffic shaper device that they exceed the configured output bandwidth, they may be enqueued in a buffer inside the traffic shaper device and transmitted later so that an output bandwidth limit criterion is fulfilled. Due to reduction of burstiness of streams, traffic shaping at network edges makes aggregate bandwidth easier to manage. A reduction of burstiness is accomplished since the data packet stream output from the traffic shaper device is output at regular intervals (i.e. with the output bandwidth of the traffic shaper device) so that formation of data packet clusters is suppressed or prevented.

Queuing, i.e. buffering of packets, however, presents two problems:

1) with a large number of shaped streams (e.g. more than one data source supplies data packet streams to a network element), a per-stream buffer space may be limited, and 2) queuing increases end-to-end delay between a sending communication side and a receiving communication side. This in turn has adverse effects on quality in the case of VoIP and videoconferencing as experienced by an end user.

Due to this, traffic shapers usually have a limited per-stream buffer space combined with burst allowance. Burst allowance is defined as an allowed variation of bandwidth from the nominal bit rate of the stream. Another name for burst allowance is leaky bucket regulator. More precisely, the larger the burst allowance, the larger clusters of packets can pass through the shaper without queuing.

However, dimensioning of the burst allowance for a traffic shaping device is rather difficult, since too large a value for the burst allowance defeats the original purpose of traffic shaping, whereas too small a value for the burst allowance leads to excessive packet losses.

In the latter connection, it has to be noted that a degree of allowable packet loss is determined for a respective application the data of which are transmitted, e.g. for a speech application (voice transmission) by the audio coding used in the media streams. Modern speech codecs can usually tolerate a small amount (less than 1%) of lost frames without clear audible degradation in speech quality. However, several consecutive frame losses will inevitably lead to severe quality problems. In many cases a modern speech codec can tolerate 2–3 adjacent missing frames without excessive degradation in subjective speech quality, provided that packet losses are separated by a large enough number of packets that have arrived at the receiver. (Note that one or more (audio) frames compose one data packet (IP data packet), while, however, one frame includes many data samples.) In listening tests, it has been observed that the mean opinion score (MOS) is roughly proportional to the average number of arrived packets between two packet losses.

SUMMARY OF THE INVENTION

Hence, it is an object of the present invention to provide a device and corresponding method for controlling a stream of data packets, by means of which the dimensioning of the burst allowance for a device for controlling a stream of data packets such as a traffic shaping device is no longer difficult and also adequate for data packets originating from whatever application.

According to the present invention, this object is, for example, achieved by a device for controlling a stream of data packets, comprising a buffer adapted to receive a data packet stream from a data source and to output said packet data stream with an output rate to a packet data communication network, a monitoring means adapted to monitor a fill level of said buffer, a detection means adapted to detect a fill level condition of said buffer, in which an incoming data packet has to be dropped, and adapted to control a dropping means for dropping an incoming data packet upon detection of said fill level condition, and further comprising an output rate control means adapted to control an output rate adjusting means which is adapted to adjust said output rate of said buffer, wherein said output rate control means, in response to said fill level condition detected by said detection means, issues a first control signal controlling said adjusting means to increase a current output rate of said buffer to a predefined output rate, and said output rate control means, in response to each non-dropped data packet received after said detection by said detection means, issues a second control signal controlling said adjusting means to decrease a currently adjusted output rate.

According to advantageous further developments of the present invention:

said output rate control means comprises a first counter means adapted to count a predetermined number N of non-dropped data packets received after said detection by said detection means and a comparator means adapted to compare said predetermined number N with the current counter value;

said output rate control means further comprises a first logic circuit adapted to output said second control signal if said comparator judges that the current counter value is less than or equal to said predetermined number N and a non-dropped data packet is received;

said first counter means is reset by said first control signal;

said first counter means is incremented if a second logic circuit judges that said first control signal is not present and a non-dropped data packet is received;

said currently adjusted output rate is decreased by a predetermined amount;

said predetermined amount is set to ($\Delta$BW/N), with $\Delta$BW being the amount by which a nominal output rate is increased and N being a predetermined number of received non-dropped data packets after increasing the nominaloutput rate;

said predetermined amount is set to ($\Delta$BW/(X*N)), with $\Delta$BW being the amount by which a nominal output rate is increased, N being a predetermined number of received non-dropped data packets after increasing the nominal output rate, and x being an arbitrary factor with X><1;

said output rate control means comprises means for controlling said output rate adjusting means to reset the output rate of said buffer to said nominal output rate after said predetermined number of received non-dropped data packets after increasing the nominal output rate has been received;

said output rate control means controls said output rate adjusting means to reset the output rate of said buffer to said nominal output rate dependent on a buffer fill level of said buffer;

said output rate control means comprises a third logic circuit adapted to issue a control signal if the fill level of said buffer monitored by said monitoring means is equal to a predetermined fill level of said buffer and if said predetermined number N of received non-dropped data packets after increasing the nominal bandwidth has been received; and said predefined output rate is a maximum output rate of said buffer Also, according to the present invention, the above object is achieved by a corresponding method for controlling a stream of data packets having like features and like advantageous further developments.

Stated in other words, according to the present invention, the burst allowance is adjusted in a predefined range dynamically based on the number of arrived packets since a last packet loss. For example, immediately after a packet loss, burst allowance is at the upper limit of the allowable range, and is decremented as more packets arrive without intervening packet losses.

With the device and/or method according to the present invention being implemented, it is advantageously enabled that bandwidth bursts are allowed when they are useful, i.e., after a packet loss when for example a codec really needs information to maintain good speech quality. The higher limit of burst allowance (i.e. the maximum output rate, as a specific example of predefined output rate, is the sum of a nominal output rate plus the amount by which the nominal output rate is increased ($\Delta$BW)) should be chosen such that traffic engineering requirements for the network in question are fulfilled. The lower limit (i.e. the nominal output rate) may be estimated from end-to-end delay calculation. Note that a nominal output rate is considered to represent a default output rate with which the buffer is configured to be operated under normal operating conditions (i.e. without a necessity to drop packets).

The present invention can also advantageously be utilized in dynamic jitter buffer adjustment.

BRIEF DESCRIPTION OF THE DRAWINGS

Still further objects, features and advantages of the present invention will become fully apparent upon referring to the subsequent description thereof in greater detail with reference to the accompanying drawings, in which.

DETAILED DESCRIPTION OF THE EMBODIMENTS

The present invention will now be described in detail with reference to the drawings.

Firstly, it has to be noted that although in the foregoing reference has been made to speech transmission as a particular example of packet data, the present invention is not limited thereto. Any kind of data flow may be subjected to the present invention as long as the data flow is a packet data stream. Also, the packet data stream need not to conform to any specific protocol. For example, the data stream may conform to the ATM (Asynchronous Transfer Mode) protocol, or to the Internet Protocol (IP), or to any other packet data based transmission protocol such as TCP/IP (Transmission Control Protocol/Internet Protocol) or the like. Also, the present invention is applicable in connection with packet loss control contexts as they are occurring in jitter buffers. Therefore, the foregoing and subsequent description refer only to a packet data stream in its most general way.

Figure 1:
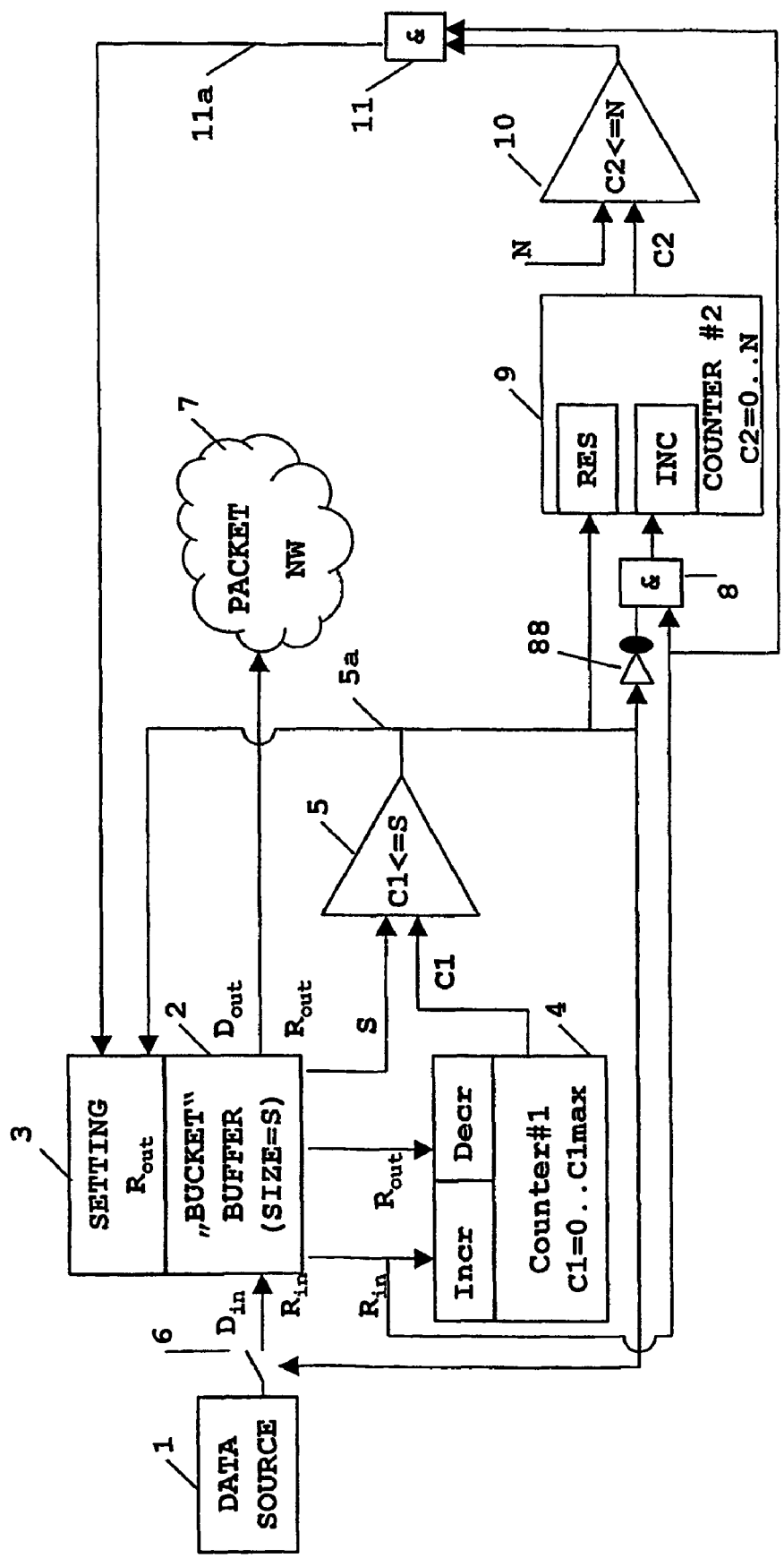
FIG. 1 shows an embodiment of the device for controlling a stream of data packets according to the present invention.

FIG. 1 shows an embodiment of the device for controlling a stream of data packets according to the present invention.

A data source 1 supplies data Din via an intermediate dropping means 6 (to be explained later) represented as a controlled switch to an input of a buffer 2 of a buffer size (storage capacity) S. The data Din are supplied at an input rate Rin. Although only one data source is shown, it is of course possible that several data sources together supply data to the buffer. In such a case, the data rate Rin is correspondingly increased as it is represented by the sum of individual input data rates. At an output of the buffer, data Dout are output at a data rate Rout to a packet based network 7 and/or network element (and/or terminal device).

Figure 2:
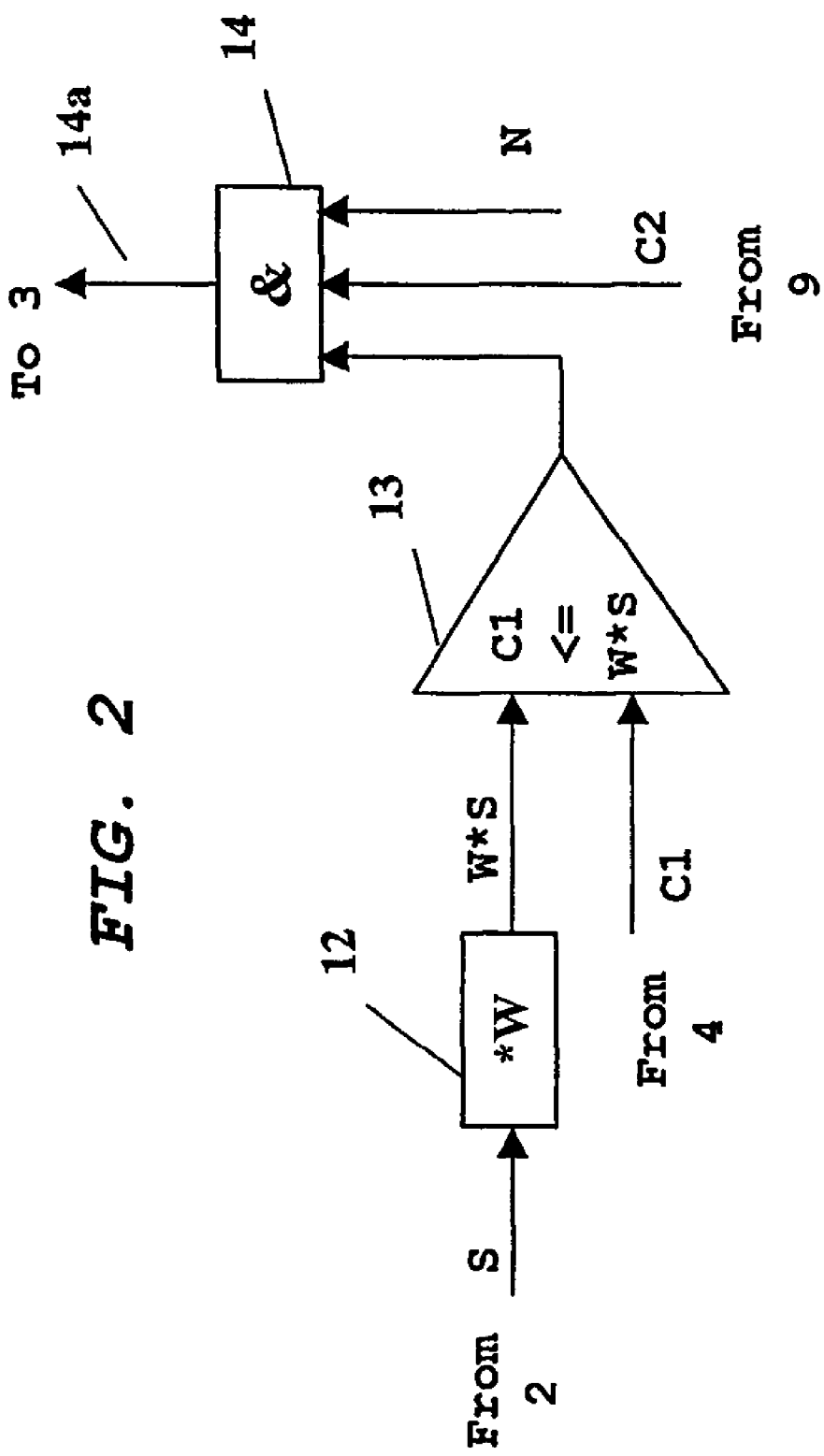
FIG. 2 shows a further embodiment as a modification to be implemented to the embodiment shown in FIG. 1.

Note that the input data rate may vary according to the behavior of the data source(s) 1. Also, the output data rate may vary. In particular, the output data rate Rout is adjusted by an output rate adjusting means 3-adapted to set the output rate Rout under control of control signals 5a, 11a, (14a as shown in FIG. 2) to be explained later. (Under normal operating conditions the output rate may be assumed to be set to a nominal output rate as a default value).

Connected to the buffer 2 is a monitoring means 4 adapted to monitor the buffer fill level. That is, each time data and/or a data packet Din is received at the input of the buffer at a respective rate Rin, a signal (Rin) is supplied to a counter 4 and the counter value is incremented. Likewise, each time data and/or a data packet Dout is output at a respective (currently set) output rate Rout, a signal (Rout) is supplied to the counter 4 and the counter value is decremented. Thus, the counter value C1 of the counter 4 always represents the fill level of the buffer 2. The counter 4 is preferably an upward-downward counter. However, it may be realized as an upward counter and a downward counter with the difference of count values thereof being calculated in order to obtain the current buffer fill level.

The current fill level of the buffer 2 is represented by the counter value C1, which is supplied to a detection means 5 (a comparator means). At the detection means 5, the counter value C1 is compared with the size of the buffer S. That is, it is detected whether the counter value C1 is less or equal the buffer size. If not, i.e. if the counter value C1 is greater than the buffer size S, the comparator 5 detects that the buffer is full and/or will overflow and issues a control signal 5a supplied to the dropping means 6. Note that in a modification (not shown), the detection means may also be configured such that it is detected whether the buffer is almost full by comparing the buffer fill level with a certain percentage of the buffer size, so that it is detected whether the fill level exceeds e.g. 95% of the buffer size S or not.

In response to the control signal 5a, the switch 6 will be opened so that subsequently arriving data/data packets will not reach/enter the buffer and are thus dropped/discarded. During this, the buffer continues to output data and will at some time reach a state in which the detection means/comparator 5 issues a signal indicating that the buffer is not full so that dropping of data packets is stopped (the dropping means/switch 6 is closed again).

Figure 3:
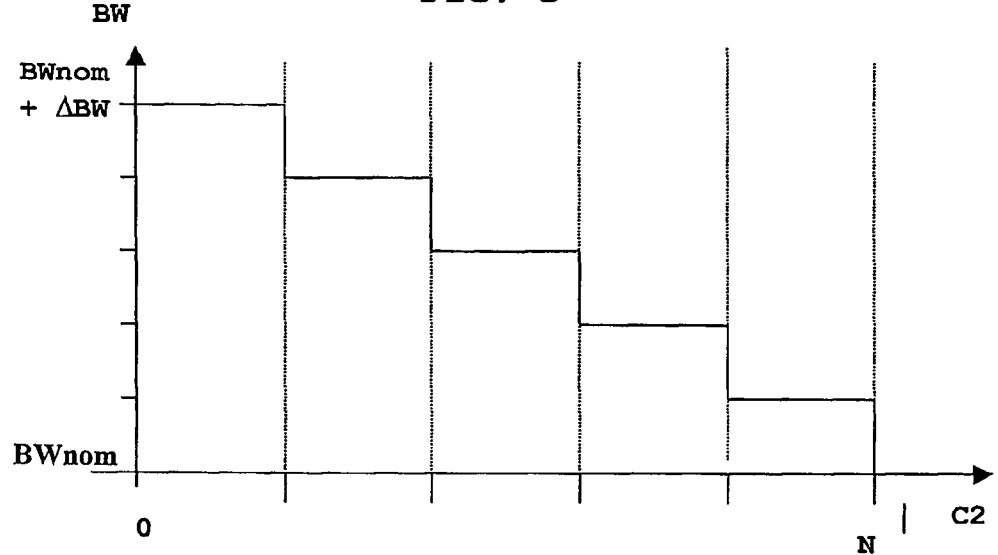
FIG. 3 shows a diagram of the output bandwidth (output rate) of the device for controlling a stream of data packets versus a number of arrived packets after a previous packet loss for the case of an implementation-as described in connection with FIG. 1.
Figure 4:
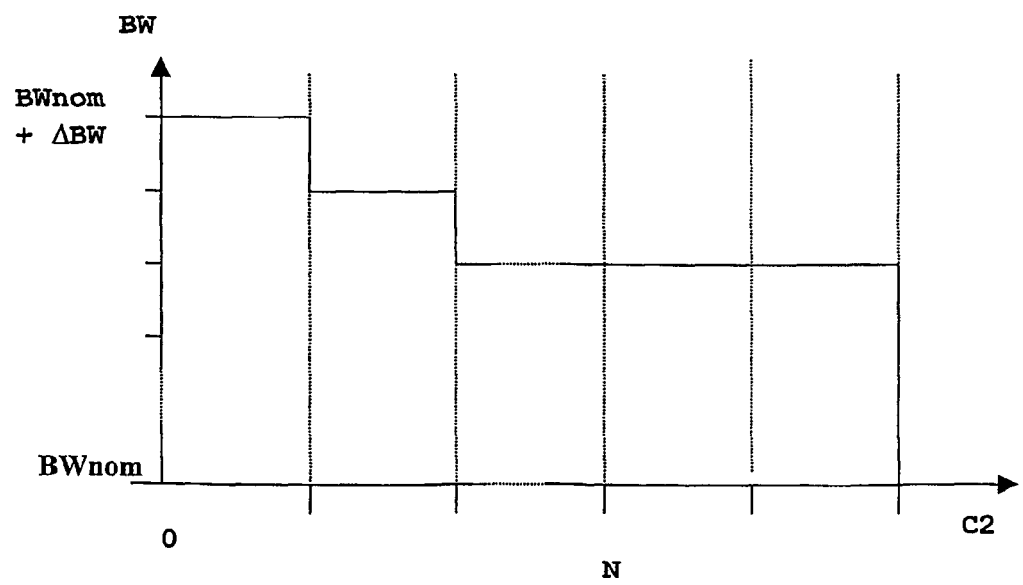
FIG. 4 shows a diagram of the output bandwidth (output rate) of the device for controlling a stream of data packets versus a number of arrived packets after a previous packet loss for the case of an implementation as described in connection with FIG. 2.

When the detection means 5 detects that the buffer is full (or, according to the conceivable modification, nearly full) and that one or more packets will have to be dropped, the detection signal 5a is also supplied as a first control signal to the output rate adjusting means 3. In response to this first control signal, the setting of Rout of the buffer is effected such that Rout is set from a nominal (i.e. default) output rate (bandwidth) BWnom to a predefined output rate such as for example to its maximum output rate. That is, the output rate (bandwidth) BW is BWnom+ΔBW (as shown in FIGS. 3 and 4) and thus increased by a an amount ΔBW to a predefined output rate such as the maximum output rate. Note that the comparator 5 acts as a detection means as well as it acts as a part of the output rate control means.

Also, the signal 5a is supplied to a reset input of another counter 9, such that a counter value of the counter 9 will be reset to zero each time the signal 5a is supplied thereto. In addition, the signal 5a is fed via an inverting means 88 to an input of an AND gate 8 as a second logic circuit. Another input of the AND gate 8 is connected to the signal line labeled Rin indicating the reception of a data packet at the buffer 2 (and incrementing the counter 4). Thus, the counter 9 counts, represented by a counter value C2, the number of received packets after a dropped packet. As long as the signal Sa is active and/or issued by the detection means 5, the counter 9 remains reset to zero. Only if the signal 5a is changed to be inactive (since the buffer is not full), the counter begins to count. The counter counts only those data packets received at the buffer 2 which are received while the signal 5a is inactive (e.g. has a logical level of zero), so that the output of the inverter 88 is active (e.g. has a logical value of one). Then, each received data packet will lead to an output signal of the AND gate 8 which increments the counter 9 (counter value C2).

The counter value C2 is compared by a comparator means and/or comparator 10 with a preset value N. N represents the number of data packets received since a recent loss/dropping of data packets, for which number the output rate Rout of the buffer is controlled to be decremented. Thus, for each counter value C2 smaller or equal to N, the comparator 10 outputs an active signal (e.g. of logical value of one) supplied to an input terminal of an AND gate 11 (a first logic circuit). To another input terminal of the AND gate 11 there is connected the signal line labeled Rin indicating the reception of a data packet at the buffer 2 (and incrementing the counter 4). Thus, as long as the counter value C2 is smaller than or equal to N and a data packet is received (after the recent packet dropping), the AND gate 11 outputs a control signal 11a supplied as a second control signal to the output rate adjusting means 3. In response to the second control signal, the output rate adjusting means 3 is controlled to decrement the output rate Rout (output bandwidth), e.g. to decrement it by a predetermined amount. Hence, the maximum output rate is decremented N times in this example.

Assuming that the output rate adjusting means is configured such that the decrementing step is set to a absolute value of ΔBW/N, then the output rate (bandwidth) BW is reduced from its predefined (e.g.maximum) output rate value BWnom+ΔBW to its nominal value BWnom after reception of N consecutive data packets after the last loss/dropping of a data packet.

This functional principle of the arrangement illustrated in FIG. 1 is represented in FIG. 3. Namely, FIG. 3 shows a diagram of the output bandwidth BW of the device for controlling a stream of data packets versus a number of arrived packets C2 after a previous packet loss. The condition of the buffer 2 in which a previous packet had to be dropped is indicated by C2=0 (counter 9 is reset in this condition). Then, each time a data packet is received after the previous dropping, the output rate (bandwidth) is reduced by a step of ΔBW/N, so that after N received packets, the nominal output bandwidth of the buffer is reached again (restored). In each case in which a packet has to be dropped before N packets have been received, the counter 9 will be reset to zero and the output rate of the buffer 2 will be set to the predefined (e.g. its maximum) output rate value. With respect to the diagram shown in FIG. 3, this will correspond to a "jump" to the position C2=0 and BW=BWnom+ΔBW. Thus, a current output rate is increased to a predefined output rate each time a packet has to be dropped.

Herein above, it has been assumed that the step width for decrementing the maximum output bandwidth of the buffer is set to ΔBW/N. However, its conceivable that the step width is set to ΔBW/(X*N), X being an arbitrary factor not equal to one, i.e. X><1.

In a case of X>1, the step width for decrementing is reduced as compared to the above example of ΔBW/N. Thus, after reception of N data packets after the recently dropped data packet, the output bandwidth will not have been reduced to its nominal bandwidth.

Likewise, in a case of X<1, the step width for decrementing is increased as compared to the above example of ΔBW/N. Thus, after reception of N data packets after the recently dropped data packet, the output bandwidth will have been reduced below its nominal bandwidth. (This implementation may be less advantageous since the buffer will take a longer time to reduce its fill level because the output rate/bandwidth of the buffer is more quickly reduced.)

In any of the two immediately preceding cases (i.e. for x>1 or x<1), it may be desirable to reset the output bandwidth to its nominal value BWnom.

To this end, in a modification of the embodiment of the invention as described in connection with FIG. 2 (and FIG. 4 representing the case of X>1), the output rate control means comprises means 12, 13, 14 for controlling said output rate adjusting means 3 to reset the output rate of said buffer 2 to said nominal output rate after said predetermined number of received non-dropped data packets after increasing the nominal bandwidth has been received.

According to the modification, said output rate control means controls said output rate adjusting means 3 to reset the output rate of said buffer 2 to said nominal output rate dependent on a buffer fill level of said buffer 2.

An implementation of said modification is shown in FIG. 2. A buffer fill level at which the nominal output bandwidth is desired to be reset is derived by weighting the maximum fill level with a weighting factor W in a weighting device such as a multiplier 12. Of course, the weighting factor W should be chosen to be less than one, since the buffer 2 may never reach a fill level higher than its maximum fill level S.

The weighted fill level W*S is supplied to an input terminal of a comparator means 13. The comparator means 13 compares the value of W*S with the current fill level, represented by the counter value C1, of the buffer 2. The comparator 13 outputs an active signal (of a high level such as logical one) if the current counter value C1 (buffer fill level) is below or equal to the value W*S, i.e. if the buffer fill level has reached or fallen below the predetermined fill level.

The output signal of the comparator 13 is supplied as an input signal to an AND gate 14 as a third logic circuit. Other input signals of said AND gate 14 are the counter value C2 representing the number of received packets after the last dropping of a packet and the predetermined number N of packets for which the output bandwidth is to be reduced/decremented. Thus, only if C2 equals N, and if simultaneously the predetermined fill level S*W or a lower fill level of the buffer 2 has been reached, the logic circuit 14 outputs a (third) control signal 14a. The signal 14a is supplied to the output rate adjusting means 3, which in response to the reception of the third control signal 14a resets the output bandwidth of the buffer 2 to its nominal value BWnom. Note that the logic circuit 14 may be composed of two AND gates, one checking for equality of C2 with N, and the other checking subsequently the simultaneous presence of the conditions C1<=W*S and C2=N. Only for simplicity of drawing, the logic circuit 14 has been represented as a single logic gate.

The functionality of this modification is illustrated in FIG. 4. Similarly to FIG. 3, after detection of a cell/packet to be dropped or dropped (C2=0), the output bandwidth is increased to a predefined output rate, e.g. to its maximum value BW=BWnom+ΔBW. Upon reception of each subsequent packet, the output bandwidth is reduced by a step of width ΔBW/(X*N). Hence, after reception of N data packets, the output bandwidth BW of the buffer 2 will have reached a value of BW=BWnom+ΔBW−N*(ΔBW/X*N) =BWnom+ΔBW−(ΔBW/X). Then, the output bandwidth is no longer decremented because of the output signal of the first logic circuit 11 shown in FIG. 1 and explained in connection therewith. Only a certain number of received data packets afterwards (i.e. after more than N received packets after a dropping of a packet), the condition C1<=W*S is also fulfilled (due to the buffer becoming more empty), and then the output bandwidth of the buffer is reduced by a "jump", that is, it is reset, to its nominal value BWnom, as shown in FIG. 4.

Herein above, different cases for a step width for decrementing the output bandwidth have been considered. In any of these cases, the step width had been assumed to be equal for each step of decrementing. However, in a further modification (not shown) it is conceivable that the step width also depends on the number of received packets. For example, as in the preceding cases, immediately after dropping of a data packet the bandwidth is increased to a predefined output rate such as-to its maximum value. However, afterwards, a first number of first decrementing steps uses a smaller decrement, so that the buffer will be supported to be emptied more quickly due to a higher output bandwidth, while afterwards, the decrementing steps may use a larger decrement as the buffer has already become "more empty", before reducing the buffer output bandwidth to its nominal value.

The reduction to the nominal value may be effected such that BWnom is reached after N received data packets (similar as in the case described in connection with FIG. 1, 3), or that the output bandwidth after N received data packets is still above the nominal output bandwidth and is reset upon the occurrence of a specific condition (similar as in the case described in connection with FIG. 2, 4).

A) For example, a decrementing step width may be configured in the output rate adjustment means to be (ΔBW/((N+1−C2)*N)). Then, with each received data packet the decrementing step width is varied: for the first received packet C2=1, the decrement is (ΔBW/N²), while for the N-th received packet, the decrement is (ΔBW/N). Of course, this example may be combined with a factor X as mentioned above.

B) Still further, the decrementing step width may be defined to be equal within intervals of counter values C2, while being different between respective intervals. For example, a decrementing step width may be configured in the output rate adjustment means to be (ΔBW/N) for all values of C2 between C2=0 . . . N2, and to be (ΔBW/(X*N)) for all values of C2 between C2=((N/2)+1) . . . N, X being a factor as mentioned further above and X>1. Also, more than two intervals are possible to be defined. (Note that in the immediately preceding example, this could be considered as if N intervals were defined).

C) The proposals as indicated under item A) and B) above may also be combined, so that within intervals of count values C2, the decrementing step width may vary, or that within one or more intervals the step width may be constant while within the other intervals it may be varying.

Heretofore, the present invention has mainly been described with a focus on a specific hardware implementation thereof which was chosen as an example. Nevertheless, it should be clear that the present invention covers also any hardware arrangement as long as it is operated according to the method according to the present invention.

Namely, any hardware arrangement operated such that it implements a method for controlling a stream of data packets, comprising the steps of buffering, in a buffer 2, a data packet stream received from a data source 1 and outputting said packet data stream from said buffer 2 with an output rate to a packet data communication network 7, monitoring a fill level of said buffer 2, detecting a fill level condition of said buffer 2, in which an incoming data packet has to be dropped, and controlling a dropping means 6 for dropping an incoming data packet upon detection of said fill level condition, and further comprising the steps of controlling an output rate adjusting means 3 to adjust said output rate of said buffer 2, wherein in response to said fill level condition detected in said detecting step, a first control signal 5a is issued, controlling said adjusting means 3 to increase a current output rate of said buffer to a predefined output rate, and in response to each non-dropped data packet received after said detecting, a second control signal 11a is issued, controlling said adjusting means 3 to decrease a currently adjusted output rate, is intended to be covered by the present invention.

Also, any method wherein according to respective further developments said controlling step comprises a first counting step for counting a predetermined number N of non-dropped data packets received after said detection in said detecting step and a comparing step for comparing said predetermined number N with the current counting value;

said controlling step further comprises a first logic evaluating step for outputting said second control signal 11a if said comparing step yields that the current counter value is less than or equal to said predetermined number N and a non-dropped data packet is received;

there is a further step of resetting and restarting said first counting step by said first control signal 5a;

there is a step of incrementing, in said first counting, if a second logic evaluating step yields that said first control signal 5a is not present and a non-dropped data packet is received;

said currently adjusted output rate is decreased by a predetermined amount;

said predetermined amount is set to (ΔBW/N), with ΔBW being the amount by which a nominal output rate is increased and N being a predetermined number of received non-dropped data packets after increasing the nominaloutput rate;

said predetermined amount is set to (ΔBW/(X*N)), with ΔBW being the amount by which a nominal output rate is increased, N being a predetermined number of received non-dropped data packets after increasing the nominaloutput rate, and x being an arbitrary factor with X><1;

there is a step of controlling said output rate adjusting means 3 to reset the output rate of said buffer 2 to said nominal output rate after said predetermined number of received non-dropped data packets after increasing the nominal output rate has been received;

there is a step of controlling said output rate adjusting means 3 to reset the output rate of said buffer (2) to said nominal output rate dependent on a buffer fill level of said buffer 2;

there is a third logic evaluating step for issuing a control signal 14a if the fill level of said buffer monitored in said monitoring step is equal to a predetermined fill level of said buffer 2 and if said predetermined number N of received non-dropped data packets after increasing the nominal output rate has been received, is intended to be covered by the present invention.

Accordingly, as has been described herein before, the present invention proposes a device for controlling a stream of data packets, comprising: a buffer 2 adapted to receive a data packet stream-from a data source 1 and to output said packet data stream with an output rate to a packet data communication network 7, a monitoring means 4 adapted to monitor a fill level of said buffer 2, a detection means 5 adapted to detect a fill level condition of said buffer 2, in which an incoming data packet has to be dropped, and adapted to control a dropping means 6 for dropping an incoming data packet upon detection of said fill level condition, and further comprising an output rate control means 5a, 8, 9, 10, 11, 12, 13, 14 adapted to control an output rate adjusting means 3 which is adapted to adjust said output rate of said buffer 2, wherein said output rate control means, in response to said fill level condition detected by said detection means 5, issues a first control signal 5a said adjusting means 3 to increase a current output rate of said buffer to a predefined output rate, and said output rate control means, in response to each non-dropped data packet received after said detection by said detection means 2, issues a second control signal 11a controlling said adjusting means 3 to decrease a currently adjusted output rate. The present invention also proposes a corresponding control method.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. A device for controlling a stream of data packets, comprising:

a buffer (2) adapted to receive a data packet stream from a data source (1) and to output said packet data stream with an output rate to a packet data communication network (7), a monitoring means (4) adapted to monitor a fill level of said buffer (2), a detection means (5) adapted to detect a fill level condition of said buffer (2), during which fill level condition an incoming data packet has to be discarded, and adapted to control a discarding means (6) for discarding an incoming data packet during the presence of said fill level condition, and further comprising an output rate control means (5, 5a, 8, 9, 10, 11; 12, 13, 14) adapted to control an output rate adjusting means (3) which is adapted to adjust said output rate of said buffer (2), wherein said output rate control means, during the presence of said fill level condition detected by said detection means (5), issues a first control signal (5a) controlling said adjusting means (3) to increase a current output rate of said buffer to a predefined output rate and said output rate control means, in response to each non-discarded data packet received after the presence of said fill level condition detected by said detection means (5) is over, issues a second control signal (11a) controlling said adjusting means (3) to decrease a currently adjusted output rate.

2. A device according to claim 1, wherein said output rate control means comprises a first counter means (9) adapted to count a predetermined number (N) of non-discarded data packets received after said detection by said detection means (2) and a comparator means (10) adapted to compare said predetermined number (N) with the current counter value.

3. A device according to claim 2, wherein said output rate control means further comprises a first logic circuit (11) adapted to output said second control signal (11a) if said comparator judges that the current counter value is less than or equal to said predetermined number (N) and a non-discarded data packet is received.

4. A device according to claim 2, wherein
said first counter means is reset by said first control signal (5a).

5. A device according to claim 4, wherein
said first counter means is incremented if a second logic circuit (8) judges that said first control signal (5a) is not present and a non-discarded data packet is received.

6. A device according to claim 1, wherein said currently adjusted output rate is decreased by a predetermined amount.

7. A device according to claim 6, wherein
said predetermined amount is set to (ΔBW/N), with ΔBW being the amount by which a nominal output rate is increased and N being a predetermined number of received non-discarded data packets after increasing the nominal output rate.

8. A device according to claim 6, wherein
said predetermined amount is set to (ΔBW/(X*N)), with ΔBW being the amount by which a nominal output rate is increased, N being a predetermined number of received non-discarded data packets after increasing the nominal output rate, and X being an arbitrary factor with X><1.

9. A device according to claim 8, wherein
said output rate control means comprises means (12, 13, 14) for controlling said output rate adjusting means (3) to reset the output rate of said buffer (2) to said nominal output rate after said predetermined number of received non-discarded data packets after increasing the nominal output rate has been received.

10. A device according to claim 9, wherein
said output rate control means controls said output rate adjusting means (3) to reset the output rate of said buffer (2) to said nominal output rate dependent on a buffer fill level of said buffer (2).

11. A device according to claim 10, wherein
said output rate control means comprises
a third logic circuit (14, 13, 12) adapted to issue a control signal (14a) if the fill level of said buffer monitored by said monitoring means is equal to a predetermined fill level of said buffer (2) and if said predetermined number (N) of received non-discarded data packets after increasing the nominal bandwidth has been received.

12. A device for controlling a stream of data packets according to claim 1, wherein said buffer (2) to which said data packets stream is supplied is a jitter buffer.

13. A device according to claim 1, wherein said predefined output rate is a maximum output rate of said buffer.

14. A method for controlling a stream of data packets, comprising:
buffering, in a buffer (2), a data packet stream received from a data source (1) and outputting said packet data stream from said buffer (2) with an output rate to a packet data communication network (7),
monitoring a fill level of said buffer (2),
detecting a fill level condition of said buffer (2), during which an incoming data packet has to be discarded, and
controlling a discarding means (6) for discarding an incoming data packet during the presence of said fill level condition, and further comprising the steps of
controlling an output rate adjusting means (3) to adjust said output rate of said buffer (2),
wherein
during the presence of said fill level condition detected in said detecting step, a first control signal (5a) is issued, controlling said adjusting means (3) to increase a current output rate of said buffer to a predefined output rate, and
in response to each non-discarded data packet received after the presence of said fill level condition is over, a second control signal (11a) is issued, controlling said adjusting means (3) to decrease a currently adjusted output rate.

15. A method according to claim 14, wherein
said controlling step comprises
first counting step for counting a predetermined number (N) of non-discarded data packets received after said detection in said detecting step and
a comparing step for comparing said predetermined number (N) with the current counting value.

16. A method according to claim 15, wherein
controlling step further comprises
a first logic evaluating step for outputting said second control signal (11a) if said comparing step yields that the current counter value is less than or equal to said predetermined number (N) and a non-discarded data packet is received.

17. A method according to claim 15, further comprising a step of resetting and restarting said first counting step by said first control signal (5a).

18. A method according to claim 17, comprising
incrementing, in said first counting, if a second logic evaluating step yields that said first control signal (5a) is not present and a non-discarded data packet is received.

19. A method according to claim 14, wherein said currently adjusted output rate is decreased by a predetermined amount.

20. A method according to claim 19, wherein
said predetermined amount is set to (ΔBW/N), with ΔBW being the amount by which a nominal output rate is increased and N being a predetermined number of received non-discarded data packets after increasing the nominal output rate.

21. A method according to claim 19, wherein
said predetermined amount is set to (ΔBW/(X*N)), with ΔBW being the amount by which a nominal output rate is increased, N being a predetermined number of received non-discarded data packets after increasing the nominal output rate, and x being an arbitrary factor with X><1.

22. A method according to claim 21, comprising
controlling said output rate adjusting means (3) to reset the output rate of said buffer (2) to said nominal output rate after said predetermined number of received non-discarded data packets after increasing the nominal bandwidth has been received.

23. A method according to claim 22, comprising
controlling said output rate adjusting means (3) to reset the output rate of said buffer (2) to said nominal output rate dependent on a buffer fill level of said buffer (2).

24. A device according to claim 23, comprising
a third logic evaluating step for issuing a control signal (14a) if the fill level of said buffer monitored in said monitoring step is equal to a predetermined fill level of said buffer (2) and if said predetermined number (N) of received non-discarded data packets after increasing the nominal bandwidth has been received.

25. A method for controlling a stream of data packets according to claim 14, wherein said data packet stream is buffered in a jitter buffer.

26. A method according to claim 14, wherein said predefined output rate is a maximum output rate of said buffer.

* * * * *